United States Patent [19]
Hause

[11] 3,747,730
[45] July 24, 1973

[54] THREE-SPEED TRANSMISSION AND CONTROLS

[75] Inventor: Gilbert K. Hause, Bloomfield Hills, Mich.

[73] Assignee: General Motors Corporation, Detroit, Mich.

[22] Filed: Nov. 12, 1965

[21] Appl. No.: 513,638

Related U.S. Application Data
[63] Continuation of Ser. No. 415,665, Dec. 3, 1964, abandoned.

[52] U.S. Cl............... 192/87.11, 74/752 A, 74/869
[51] Int. Cl..... F16d 25/10, F16h 3/74, B60k 21/00
[58] Field of Search..................... 192/87.11, 87.13, 192/87.15, 87.18, 109; 74/752, 869

[56] References Cited
UNITED STATES PATENTS

| | | | |
|---|---|---|---|
| 2,113,088 | 5/1938 | Jonsson............................. | 192/87.1 |
| 2,519,050 | 8/1950 | Kelber et al. ......................... | 74/472 |
| 2,597,245 | 5/1952 | Kelber..................................... | 74/765 |
| 3,083,589 | 4/1963 | Knowles et al. ...................... | 74/677 |
| 3,138,971 | 6/1964 | Fisher et al............................. | 74/752 |
| 3,279,573 | 10/1966 | Hensel............................. | 192/87.11 |

FOREIGN PATENTS OR APPLICATIONS 1,346,916  11/1963  France............................ 192/87.11

Primary Examiner—Arthur T. McKeon
Attorney—W. E. Finken, Albert M. Heiter and Charles R. White

[57] ABSTRACT

This invention provides an improved clutch and servo arrangement for automatic transmissions including a drum and two pistons for actuating two clutches wherein one piston is nested within another piston such that a servo chamber is provided between the two pistons and two additional servo chambers are provided between the drum and one of the pistons. The arrangements of clutches and gearing provides for three forward drive ratios by admitting pressure successively to the three servo chambers without the need to release pressure from any chamber during upshift ratio change. Means effective in two drive ratios is provided for decreasing the pressure in one servo chamber in response to increase in vehicle speed, and this means is controlled upon upshift to a third drive ratio to deliver full line pressure to the servo chamber.

27 Claims, 8 Drawing Figures

Patented July 24, 1973  3,747,730

INVENTOR.
Gilbert K. Hause
BY
Robert L. Spencer
ATTORNEY

INVENTOR
Gilbert K. House
BY
Robert L. Spencer
ATTORNEY

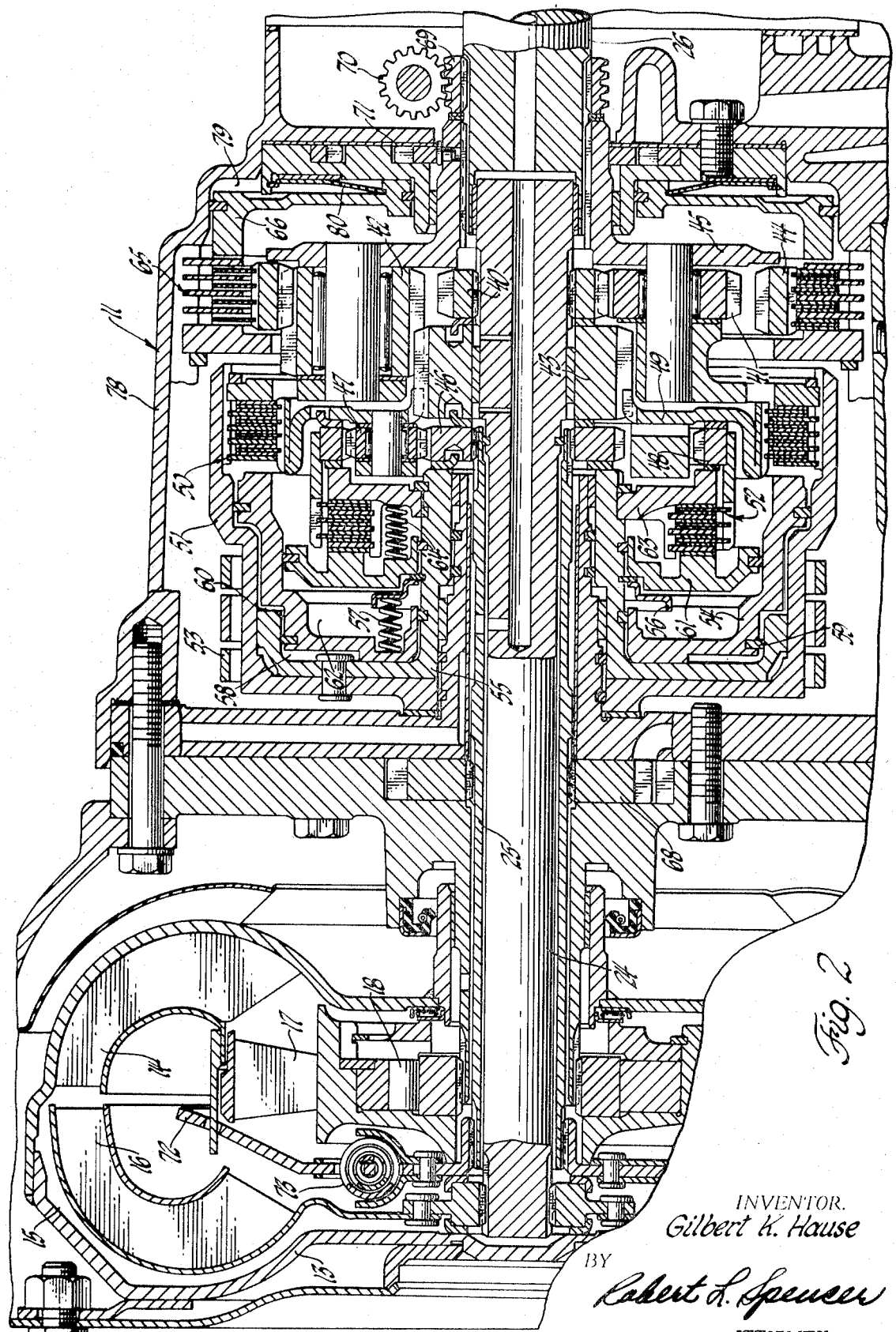

INVENTOR.
Gilbert K. Hause
BY
Robert L. Spencer
ATTORNEY

INVENTOR.
Gilbert K. Hause
BY
Robert L. Spencer
ATTORNEY

THREE-SPEED TRANSMISSION AND CONTROLS

This application is a continuation of application Ser. No. 415,665, now abandoned filed Dec. 3, 1964, and relates to an improved automatic transmission and controls therefor.

The invention provides an improved servo arrangement for actuating friction gripping elements such as clutches or brakes wherein a pair of fluid pressure responsive servos are each disposed within a common drum and wherein one of the servos is nested within the other of the servos. By this arrangement, first, second and third chambers are provided for receiving fluid under pressure to control the actuation of the friction gripping elements. The effective area of the first and third chambers is substantially equal. A servo release spring disposed in the third chamber biases one servo towards its released position. The structural nested arrangement of the drum and servos is such that upon application of fluid pressure to the first chamber disposed between the drum and first servo, a first friction engaging member or clutch will be engaged to establish a first transmission drive ratio. By continuing the application of pressure in the first chamber and introducing pressure to the third chamber located intermediate the two servos, a second friction gripping element or clutch is engaged and the first clutch is released to establish a second drive ratio. In making this shift, the spring causes the first servo to move toward its release position such that the first servo by such movement acts as an accumulator to delay the rate of pressure rise in the third chamber to assure smooth transition of drive ratio. To establish a third drive ratio, fluid pressure is admitted to a second chamber located between the drum and first servo while pressure is maintained in the first and third chambers. This causes reengagement of the first clutch while maintaining the second clutch engaged.

The specific arrangement of the drum and the nested servos or pistons with respect to each other and that of the servo chambers with respect to the drum and each other are important features which make possible a compact improved structure and are believed novel.

The invention provides an improved gearing arrangement incorporating two planetary gearing units wherein a first gearing unit includes intermeshing planet gears supported in a final power delivery planet carrier and two sun gears. The second gear unit includes a planet carrier fixed for rotation with one sun gear of the first gear unit, and a set of planet pinions in mesh with a sun gear and a ring gear. One sun gear of each gear unit comprises a power input sun gear and the second sun gear of the first gear unit is alternately braked against rotation, is driven at reduction drive ratio of the second gear unit, or driven at direct drive ratio by the second gear unit. It is contemplated that both power input sun gears of the first and second gear units may be driven either from a common shaft driven by a hydrodynamic torque transmitting unit or by different shafts, one driven by the hydrodynamic torque transmitting unit and the other directly by the vehicle engine through a different torque path. In the one embodiment, all drive is hydraulic through the hydrodynamic torque transmitting unit. In the other embodiment, drive is all hydraulic in low gear, is partially mechanical and partially hydraulic in second and high gear. For example, drive in the split-torque embodiment may be 100 percent hydraulic in low gear drive, 36 percent mechanical in second gear drive, and 57 percent mechanical in direct drive.

Additional features are incorporated in the servos for actuating a brake and a pair of clutches to establish the various drive ratios whereby smooth change of drive ratio is accomplished.

Among the features is a pressure metering valve effective in first and second gear drive ratios for decreasing the pressure in one servo chamber in response to increase in vehicle speed when operating in first and second gear drive and controlled by a shift valve to deliver full line pressure to the servo chamber when the shift valve is positioned for direct drive operation. This valve is also effective to deliver full line pressure when the manual valve is positioned for low range operation.

These and other features and advantages of this invention will be apparent from the following description and claims, in which:

FIG. 2 is a sectional view of a second embodiment of the transmission.

FIG. 3b is a hydraulic schematic diagram of a second portion of the control system for use with either gearing embodiment.

Figure 1A:
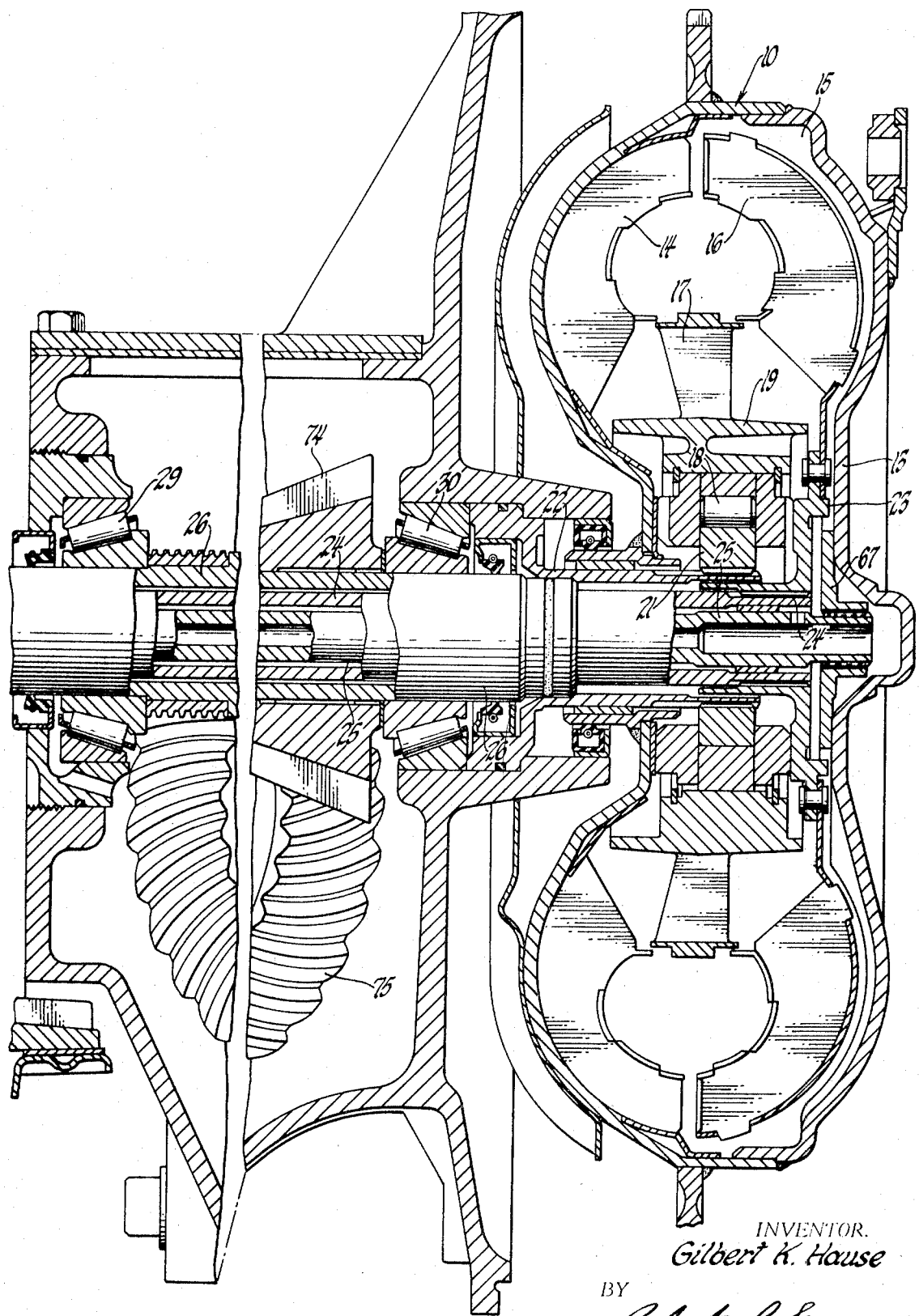
FIG. 1a is a sectional view through a first portion of a first embodiment of the invention.
Figure 1B:
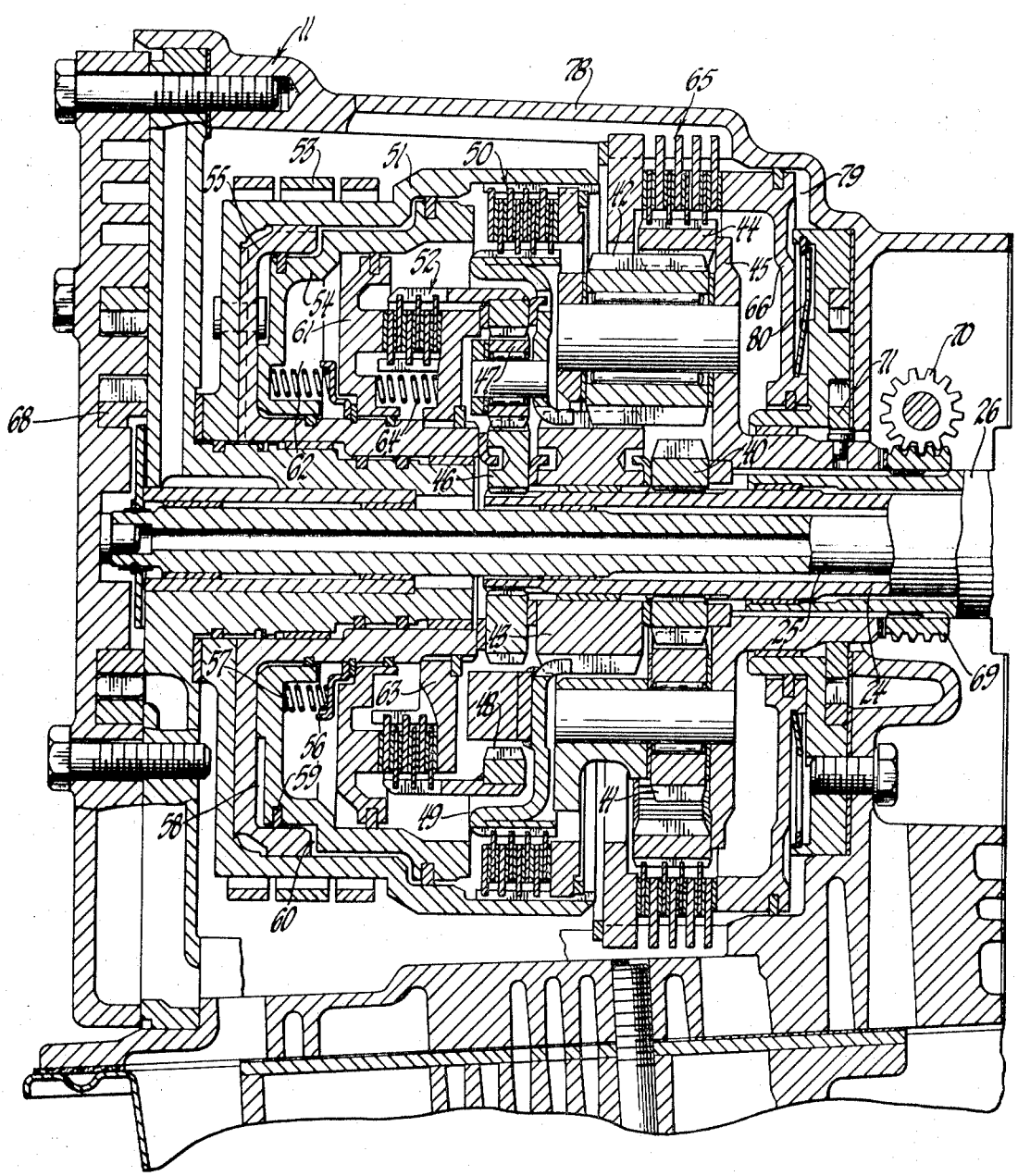
FIG. 1b is a sectional view through a second portion of a first embodiment of the invention.

Referring to FIGS. 1a and 1b, there is shown a first embodiment of the transmission wherein drive from the engine to the transmission gearing is all hydraulic through a torque converter in all transmission drive ratios.

The transmission in general includes an engine drive hydrodynamic torque transmitting unit indicated generally at 10, a planetary gearing unit indicated generally at 11 and driven by torque converter 10 and adapted to drive a final power delivery shaft 26. The planetary gearing unit is adapted to provide three forward drive ratios including first gear, second gear, and direct drive and reverse drive in addition to neutral.

Hydrodynamic torque transmitting unit 10 includes an engine driven impeller 14 driven by an engine (not shown) through a drum 13 which forms a chamber 15 having working fluid therein. Also disposed in chamber 15 are a turbine 16 and a reaction member 17. A one-way brake 18 prevents reverse rotation of reaction member 17 and permits free forward rotation of the reaction member. Brake 18 grounds the hub 19 of the bladed reaction member to a race 21 fixed to a nonrotatable ground sleeve 22. A turbine hub 23 fixed to bladed turbine 16 is splined to a hollow sleeve shaft 24 supported upon a pump drive shaft 25 for rotation with respect to shaft 25. Shaft 24 is rotated by and is rotatable as a unit with turbine 16 and comprises the sole power input shaft for gear unit 11. A hub member 67 connects pump drive shaft 25 to drum 13 for rotation at engine speed. Final power delivery shaft 26 rotates at various drive ratios as determined by the condition of operation of gear unit 11. Shaft 26 is supported in the transmission case 28 by means of spaced bearings 29 and 30.

As best shown in FIG. 1b, gear unit 11 includes a first planetary gearing assembly comprising relatively narrow and wide intermeshing planet pinion gears 41 and 42 supported in a final power delivery carrier 45, a power input sun gear 40 driven by power input shaft 24 and in mesh with narrow planet pinion gear 41, and an additional sun gear 43 in mesh with the wide planet pinion 42. A reaction ring gear 44 also in mesh with wide planet pinion 42 may be braked against rotation to establish reverse gear drive.

A second gearing assembly includes a planet pinion 47 supported in mesh with a second power input sun gear 46 and a reaction ring gear 48 by means of a carrier 49 fixed for rotation as a unit with sun gear 43 of the first planetary gearing assembly. Carrier 49 may be clutched to a rotatable drum 51 by means of a disc clutch 50. Ring gear 48 may be clutched to drum 51 by means of a disc clutch 52. Drum 51 may be held against rotation by a brake 53. Planet carrier 45 of the first gear assembly drives final power delivery shaft 26 which, in turn, may drive a vehicle drive shaft (not shown) by means of intermeshing gears 74 and 75 fixed for rotation with shaft 26 and the final output shaft (not shown), respectively.

Brake band 53 may be engaged or released by means of a fluid pressure responsive servo as hereafter more fully explained.

Disc clutch 50 may be engaged to clutch carrier 49 to drum 51 by means of a piston 54. Piston 54 is axially movable with respect to drum 51 and is positioned between drum 51 and a drum extension 55 fixed to drum 51 for rotation therewith. A clutch release spring 57 seated upon a spring seat 56 carried by drum extension 55 biases piston 54 to a clutch release position. A first chamber 58 and a second chamber 60 separated by a seal 59 are adapted to receive fluid under pressure as hereafter explained to engage clutch 50.

Disc clutch 52 may be engaged by a piston 61 to connect ring gear 48 to extension 55 of drum 51. Piston 54 forms with piston 61 a chamber 62 adapted to receive fluid pressure to apply clutch 52 and release clutch 50. A clutch release spring 64, seated upon a backing member 63 of clutch 52 and carried by drum extension 55 biases piston 61 toward its clutch released position.

A reverse brake 65 may be engaged by a piston 66, is axially movable with respect to housing 78 and may be engaged by admitting fluid pressure to a chamber 79 between piston 66 and housing 78. A brake release spring 80 biases piston 66 towards its brake release position.

Pump drive shaft 25 is connected to drum 13 by means of a connection 67, rotates at engine speed and drives a pump 68 for supplying fluid under pressure. A second pump 71 is driven by a final output shaft 26. Shaft 26 also drives governor drive gears 69 and 70.

A second embodiment of the transmission adapted to provide full hydraulic drive in low gear and partial mechanical and hydraulic drive in second and high gear is shown in FIG. 2. In the FIG. 2 embodiment, numbers the same as in FIGS. 1a and 1b are applied to parts corresponding to those of FIGS. 1a and 1b. The transmissions are similar except that the output shaft extends from one end of the transmission instead of between the converter and gear unit as in FIG. 1a and except for the modification whereby one power input shaft is mechanically driven by the engine and a second power input shaft is driven by the converter to provide a split torque drive in second gear and direct drive.

As shown in FIG. 2, an impeller 14 is driven by an engine driven power input shaft, not shown, by means of a drum 13 and rotates at engine speed. Drum 13 forms a chamber 15 having working fluid therein. A turbine 16 and a reaction member 17 are disposed in chamber 15. A one-way brake 18 prevents reverse rotation of bladed reaction member 17 and permits forward rotation of the same.

A first power input shaft 24 is driven by turbine 16 and a second power input shaft 25 is driven at engine speed by impeller 14. Shaft 25 is connected to impeller 14 by means of a connector 72 and a vibration dampener 73. Power input shaft 24 is journaled in final power delivery shaft 26 and extends through power input shaft 25. An engine driven pump 68 is driven by shaft 25 and a second pump 71 is driven by shaft 26. Gears 69 and 70 are governor drive gears.

Gear unit 11 includes a first planetary gearing assembly comprising relatively narrow and wide intermeshing planet pinion gears 41 and 42 supported in a final power delivery carrier 45, a power input sun gear 40 driven by shaft 24 and in mesh with narrow planet pinion gear 41, and an additional sun gear 43 in mesh with planet pinion 42. A reaction ring gear 44 in mesh with planet pinion 42 may be braked against rotation to establish reverse drive.

A second gearing assembly includes a planet pinion 47 supported in mesh with a second power input sun gear 46 and a reaction ring gear 48 by means of a carrier 49 fixed for rotation as a unit with sun gear 43 of the first planetary gearing assembly. Carrier 49 may be clutched to a rotatable drum 51 by a disc clutch 50. Ring gear 48 may be clutched to an extension 55 of drum 51 by a clutch 52. Drum 51 and its extension 55 may be held against rotation by a brake band 53.

Planet carrier 45 of the first gearing assembly is the transmission power delivery member and drives vehicle load shaft 26. Brake band 53 may be engaged or released by means of a fluid pressure responsive servo as hereafter more fully explained.

Disc clutch 50 may be engaged to clutch carrier 49 to drum 51 by means of a pistion 54. Piston 54 is enclosed by drum 51 and its extension 55. A clutch release spring 57 seated upon a spring seat 56 carried by drum extension 55 biases piston 54 toward its clutch release position. First and second chambers 58 and 60 separated by a seal 59 are adapted to receive fluid pressure as hereafter explained for engaging clutch 50.

Disc clutch 52 may be engaged by a piston 61 to clutch ring gear 48 to drum extension 55 and drum 51. Piston 61 forms with piston 54 a chamber 62 adapted to receive fluid under pressure to apply clutch 52 and release clutch 50 when fluid pressure is maintained in chamber 58. A clutch release spring 64 seated upon a backing member 63 of clutch 52, carried by drum extension 55, biases piston 61 toward its clutch release position.

A reverse brake 65 may be engaged by a piston 66 axially movable with respect to housing 78 by admitting fluid pressure to a chamber 79 between piston 66 and housing 78. A brake release spring 80 biases piston 66 toward its brake release position.

GENERAL GEARING OPERATION

Both gearing embodiments of FIGS. 1 and 2 are controlled by a common control system to provide neutral, three forward drive ratios and reverse.

For neutral condition of operation, brake band 53 is applied to prevent rotation of drum 51 and clutches 50, 52 and reverse brake 65 are released. Since there is no grounded reaction member for the gearing, no torque can be transmitted through the gears.

For first gear reduction drive operation, brake 53 remains engaged and clutch 50 is engaged to prevent rotation of planet carrier 49 and sun gear 43. In both embodiments of the gearing all torque input to the gearing will be through the torque converter and at the torque multiplication of the converter in low gear. Shaft 24 driven by turbine 16 will drive sun gear 40. Power flow is through gear 40 to planet pinion 41 to planet pinion 42 to carrier 45 and output shaft 26 driven by carrier 45. Reduction drive is that of the first gear assembly since the second gear assembly has no reaction member.

For second gear drive, brake 53 remains engaged, clutch 50 is released and clutch 52 is engaged to prevent rotation of ring gear 48 of the second gear assembly. In this condition of operation, sun gears 40 and 46 each apply torque to their respective gearing assemblies.

Considering the FIG. 1b embodiment wherein both sun gears 40 and 46 are driven at the same speed by turbine driven shaft 24, torque will be transmitted through gears 41, 42 to carrier 45 of the first gear assembly. At the same time, sun gear 43 of the first gear assembly will be driven forwardly at the reduction drive ratio of the second gear assembly with ring gear 48 serving as the reaction member for the second gear assembly. Thus, sun gear 43 serves both as a reaction member for the first gear assembly and as the means for imparting torque from the second gear assembly to the first gear assembly.

Considering the FIG. 2 embodiment, the action of transmitting torque is similar to that of FIG. 1b but differs in that sun gear 40 is driven by turbine 16 and sun gear 46 is driven mechanically by the engine and rotates at engine speed. Thus, in second gear drive the torque is split to be partially mechanical and partially hydraulic. In the FIG. 2 embodiment in second gear drive the torque transmitted is of the order of 36 percent mechanical drive and 64 percent hydraulic drive.

For direct drive, clutches 50 and 52 are engaged and brake 53 is released. Thus, ring gear 48 is clutched to carrier 49 through drum 51. The second gear unit assembly is thereby locked up in direct drive and rotates sun gear 43 at the speed of rotation of sun gear 46. With both sun gears 40 and 43 rotating at the same speed, the first gear assembly drives carrier 45 in direct drive.

As will be apparent, the embodiment in FIG. 2 wherein sun gear 46 is driven mechanically at engine speed and wherein sun gear 40 is driven by turbine 16 will again split the torque between mechanical and hydraulic drive. In direct drive the drive is 57 percent mechanical and 43 percent hydraulic.

It will further be understood that the embodiment in FIG. 1 may easily be made for split torque drive as taught in FIG. 2 and that the embodiment in FIG. 2 may be made all hydraulic drive as taught in FIG. 1, if desired. The embodiment of FIG. 2 incorporating dual path split torque drive is of advantage in that it reduces hydrodynamic losses in the converter when operating in second and high gear and retains all of the converter torque multiplication when operating in first gear.

REVERSE

For reverse drive, brake 53, clutch 50 and clutch 52 are released and brake 65 is engaged to prevent rotation of ring gear 44. Drive will be from sun gear 40 to pinion gear 41 to pinion gear 42. With ring gear 44 serving as the reaction member, carrier 45 will be driven in reverse at the torque multiplication of the converter and that of the first gear assembly.

TRANSMISSION CONTROL SYSTEM

A transmission control system for controlling either the FIG. 1 or FIG. 2 embodiment of the invention is shown in FIG. 3.

An engine driven pump 68 is adapted to draw fluid from a sump 85 through a passage 86 and deliver the same to a pressure delivery passage 87. Transmission driven pump 71 is adapted to draw fluid from sump 85 through passage 86 and deliver the same to passage 88. Since pump 71 may be driven in reverse when the vehicle is backed up, pump 71 tends to rob fluid from pump 68 due to such reverse operation. This is prevented by means of a recirculation passage 89 connected between suction passage 86 and pressure delivery passage 88. A ball valve 90 controls recirculation passage 89, and a rear pump charging valve 91 is provided to admit fluid from a chamber 92 to passage 88.

Assuming the vehicle is driven forwardly, pump 68 will deliver fluid to chamber 92 through a check valve 93, and pump 71 will deliver pressure to chamber 92 through a check valve 94. Ball valve 90 will be closed. When operating in reverse, pump 71 will tend to draw fluid from passage 88 and deliver the same to passage 86. In the event that pump 71 tends to build up a vacuum in passage 88, ball valve 90 will open to connect passage 88 to passage 86 to break such vacuum. In addition, valve 91 will be acted upon by pressure in chamber 92 to intermittently supply fluid from chamber 92 to passage 88 to prevent loss of charge of the pump 71.

A line pressure regulator valve 95 for controlling the pressure in line pressure supply passage 96 is connected to chamber 92. Valve 95 includes a valve member 97 having spaced lands 98, 99 and 100 and ports 101 through 105. Port 101 connects to pump pressure delivery passage 87. Port 102 connects to suction passage 86. Port 103 connects to a converter fluid supply passage 106. Port 104 connects to pump pressure supply passage 96. Port 105 connects passage 96 to a chamber 107 at the end of land 100. A regulator plug 108 includes spaced lands 109 and 110 and a pair of ports 111 and 112. Land 110 is of greater diameter than land 109. Port 111 connects a chamber 113 at the end of land 109 to a modulator valve delivery passage 121. Port 112 connects the space between lands 109 and 110 to a reverse pressure boost passage 117.

DRIVE RANGE SELECTOR VALVE

A drive range selector valve 126 is provided with spaced lands 127 and 128 and ports 129 through 132. Port 129 is an annular port connecting to line pressure supply passage 96. Port 130 connects to a drive pressure supply passage 115. Port 131 connects to a low range supply passage 116, and port 132 connects to a reverse pressure supply passage 117. Valve 126 is adapted to be positioned for neutral, low range forward, drive range forward and reverse conditions of operation.

VACUUM MODULATOR VALVE

A vacuum modulator valve 135 includes a valve member 136 having spaced lands 137, 138 and a stem 136A. Ports 139 through 144 are associated with the valve. Port 139 connects to line pressure supply passage 96. Port 140 connects to a modulator pressure delivery passage 121. Port 141 connects to a low range pressure passage 116. Ports 142 and 143 are exhaust ports. Port 144 admits modulator pressure from passage 121 to a chamber 145 at the end of land 138. A housing 146 forms a chamber 147 connected to the vehicle engine intake manifold (not shown) by a passage 148. A diaphragm 149 extending across chamber 147 is biased by a spring 150 in chamber 147 to move stem 136A and valve member 136 to the left as viewed in the figure toward a position to increase the pressure delivered to modulator pressure delivery passage 121. Vacuum in chamber 147 acts on diaphragm 149 to oppose the effective force of spring 150.

Modulator pressure in passage 121 is minimum when manifold vacuum is maximum and increases with loss of available vacuum in the engine intake manifold. As is well known, engine intake manifold vacuum is highest at closed carburetor throttle valve position and the available manifold vacuum diminishes as the carburetor throttle valve is opened to increase the fuel supply to the engine. It will readily be understood that modulator pressure increases under heavy engine torque demand conditions to cause pressure regulator valve 95 to boost the line pressure delivered to passage 96.

GOVERNOR

A conventional vehicle speed responsive governor 151 shown in block form is driven by the transmission final power delivery shaft and is supplied with pressure from rear pump 71 through passage 88. Governor 151 delivers variable governor pressure to governor pressure delivery passage 119, the pressure in passage 119 being increased in response to increase in vehicle speed. A governor of this type is fully disclosed in U.S. Pat. No. 2,762,384, issued Sept. 11, 1956, to Maurice S. Rosenberger and accordingly, further details need not be disclosed herein.

Governor pressure in passage 119 is delivered to a first to second shift valve 205, a first to second pressure regulator valve 185 and to a second to third shift valve 230 for control purposes hereafter more fully explained.

THROTTLE VALVE

A throttle valve 152 includes spaced lands 153, 154 and a stop member 155. A passage 156 connects the space between stop member 155 and land 154 to a chamber 157 at the end of land 154. A spring 158 is seated on a plunger 159 and land 153. Plunger 159 is controlled by the vehicle accelerator pedal (not shown) to move into casing 160 as the accelerator pedal is moved to open the engine carburetor throttle valve (not shown) to increase the fuel charge to the engine. Throttle valve 152 is provided with ports 161 through 163. Port 161 connects to a drive pressure supply passage 115. Port 162 connects to throttle valve pressure delivery passage 124. Port 163 connects to low range pressure passage 116. Throttle valve 152 delivers variable throttle valve pressure to passage 124, the pressure being increased as the vehicle accelerator pedal (not shown) is depressed to move plunger 159 into casing 160. Port 163 and passage 116 serve as the exhaust outlet for excess pressure when the drive range selector valve is positioned for drive range operation. When drive range selector valve 126 is positioned for low range operation, line pressure is admitted to passage 116. Throttle valve 152 will therefore deliver full line pressure to passage 124 in low range operation.

DETENT DOWNSHIFT VALVE

A detent downshift valve 165 is normally biased by a spring 166 against a stop member 167 as shown. Valve 165 includes spaced lands 168, 169 and ports 170, 171, 172. Port 170 connects to throttle valve pressure delivery passage 124. Port 171 connects to a detent pressure delivery passage 125. Port 172 is an exhaust port. A raised portion 173 on plunger 159 is adapted to contact the end of valve 165 after the accelerator pedal (not shown) has been moved beyond full throttle position to move valve 165 to connect port 170 to port 171.

It will readily be understood that throttle valve pressure in passage 124 will be a maximum or line pressure prior to the time that detent valve 165 is moved to connect passage 124 to 125. Detent pressure in passage 125 is used to provide a past full throttle forced downshift from third to second gear drive.

FORWARD BRAKE SERVO

As previously explained, brake band 53 is engaged in neutral, first and second gear forward drive and reverse, and is released in direct forward drive. Brake 53 is actuated by a servo 175 (see FIG. 3b) including a housing 176, a servo piston 177 and brake apply and brake release chambers 178 and 179 at opposite sides of the piston. A spring 180 biases piston 177 towards its brake release position.

As is apparent, passage 96 delivers line pressure to brake apply chamber 178 at all times irrespective of the position of drive range selector valve 126. In direct drive forward operation, line pressure from passage 120 is admitted to brake release chamber 179. With equal pressures in chambers 178 and 179, spring 180 is effective to move servo piston 177 to release brake 53. Piston 177 is connected to brake band 53 of FIGS. 1 and 2 by conventional linkage, not shown.

FIRST TO SECOND REGULATOR VALVE

A first to second regulator valve 185 (FIG. 3a) regulates the pressure delivered to chamber 58 of clutch servo piston 54 of FIGS. 1 and 2.

Valve 185 includes a movable valve member 186 having spaced lands 187, 188 of equal diameter and a land 189 of greater diameter movable in a housing 190. A regulator plug 191 of smaller diameter than land 189 is in axial alignment with valve member 186. A passage 192 connects the space between lands 187 and 188 to a chamber 193 at one end of land 187. A spring 194 biases valve 186 toward the right as viewed in the drawing. Ports 195 through 200 are associated with regulator valve 186 and regulator plug 191. Port 195 connects to drive pressure supply passage 115. Port 196 connects to a passage 122 leading to servo chamber 58 of servo piston 54. Ports 197 and 199 connect to a passage 118. Port 198 connects to governor pressure delivery passage 119. Port 200 connects to drive pressure supply passage 115.

Considering the operation of valve 185, with the drive range selector valve positioned for neutral or reverse, passage 115 will be exhausted through port 130 and the end of selector valve 126. In neutral and reverse, no pressure will be delivered to chamber 58 and clutch 50 will be released.

With the drive range selector valve positioned for drive range operation, fluid will be directed to passage 115 and passage 116 will be exhausted. In first and second gear drive passage 118 will also be exhausted either through passage 120 or passage 116, depending upon the position of a ball shuttle valve 201. Ball valve 201 is a two position valve which blocks off either passage 116 or passage 120 from passage 118.

In drive range operation, valve 185 is effective to deliver a variable pressure to passage 122 which decreases with increase in vehicle speed. With the vehicle stopped, governor pressure will be minimum and the pressure delivered to clutch chamber 58 will be relatively high. Drive pressure from port 200 will force regulator plug 191 against the end of valve 186, tending to move the valve to connect port 195 to port 196 to increase the pressure delivered to clutch chamber 58 through passage 122. Spring 194 and metered pressure in chamber 193 tend to move valve 186 to connect passage 122 to passage 118. Valve 186 will therefore deliver a predetermined metered pressure to passage 122. As the vehicle speed increases, governor pressure from passage 119 will apply an additional force to land 189 tending to move valve 186 to reduce the pressure delivered to servo chamber 58. Since governor pressure increases with vehicle speed, the pressure delivered to passage 122 and chamber 58 decreases with increase in speed.

This decrease of pressure in chamber 58 in response to increase in vehicle speed obtains in first and second gear drive, while not essential, is particularly useful when operating in drive range to assist in tailoring the shift points to those desired in relation to speed and torque demand. As was heretofore explained, pressure is admitted to chamber 62 (FIGS. 1 and 2) to accomplish second gear drive. Pressure admitted to chamber 62 to apply clutch 52 is also effective to release clutch 50 upon a first to second gear shift.

By supplying full line pressure to chamber 62, there is an initial buildup of pressure in a low pressure range to move piston 61 to take up slack and then initiate engagement of clutch 52 with limited torque transfer capacity and simultaneously the pressure in chamber 62 plus release spring 57 which may be assisted for further control by reducing the pressure in chamber 58 is effective to reduce the torque transmitting capacity of clutch 50 to a low value or zero to eliminate clutch drag without substantial movement of piston 54. Then piston 54 by travelling through the slack movement to its full release position reduces the rate of pressure rise in chamber 62 by its accumulator action to assure a smooth first-to-second drive ratio shift. This is accomplished by having the apply and release area of piston 54 and the apply area of piston 61 about equal or so proportioned that a lower pressure range in chamber 62 plus release spring 57 will fully release clutch 50 and then at a higher pressure range clutch 52 is gradually engaged to transmit full torque. These pressure ranges have a small or no overlap so there is small or no overlap on the shift. The reduction of pressure in chamber 58 with increasing speed releases clutch 50 earlier at higher speeds where clutch 52 due to lower torque will engage earlier.

Upon an upshift to direct drive in drive range operation, line pressure is admitted to passage 118 in a manner hereafter explained to cause valve 186 to deliver full line pressure to chamber 58. With pressure in passage 118 there is no exhaust passage for valve 186 and the valve ceases its metering function. Pressure from port 199 is effective upon land 189 and assists pressure from port 200 acting on regulator plug 191 to move the valve to connect port 195 to port 196.

In low range operation, line pressure from passage 116 will be admitted to passage 118 through shuttle valve 201 so that valve 186 will deliver full line pressure to chamber 58 as is true in direct drive. This boost in low range operation prevents brake band slippage on overrun, as in descending a steep hill.

FIRST TO SECOND SHIFT VALVE

A first to second shift valve 205 (FIG. 3a) controls the admission of pressure to chamber 62 to actuate piston 61 to engage clutch 52 and piston 54 to release clutch 50.

Valve 205 includes a housing 206, a movable valve member 207 having lands 208, 209 and 210 and a stem 211, a throttle valve plug 212 and a governor plug 213. A spring 214 yieldably biases valve member 207 toward its downshift position. Ports 215 through 221 are associated with valve member 207. Port 215 connects to drive pressure passage 115. Port 216 connects to a passage 162 leading to chamber 62 between pistons 54 and 61. Ports 217 and 219 are exhaust ports. Ports 220 and 221 connect to governor pressure delivery passage 119. Port 218 connects to low range passage 116.

Ports 223, 224, 225 and 226 are associated with regulator plug 212. Port 223 admits throttle valve pressure from passage 124 to a chamber 227 at one end of regulator plug 212. Ports 224 and 225 connect to a passage 224A and at times connect chamber 227 to a chamber 228 between plug 212 and land 210 of shift valve 207. Port 226 is an exhaust port. Land 210 is of greater diameter than plug 212. Land 210 is of greater diameter than land 209 and land 209 is of greater diameter than land 208.

Spring 214 and throttle valve pressure tend to move valve member 207 to its downshift position wherein port 216 is connected to exhaust port 217 and clutch chamber 62 is connected to exhaust. With valve member 207 in its downshift position, throttle valve pressure is admitted through passage 124 to chamber 228 and is effective upon large diameter land 210 tending to maintain the valve in its downshift position. Governor pressure is effective upon land 210 and governor plug 213 tending to upshift the valve. With drive range selector valve 126 positioned for drive range operation, valve member 207 will at some vehicle speed, depending upon throttle valve pressure, upshift to deliver pressure to chamber 62 through ports 215, 216 and passage 162. Upon such an upshift, stem 211 positions regulator plug 212 to block off port 224 and to connect chamber 228 to exhaust port 226. Throttle valve pressure will be effective only upon the end of relatively small diameter regulator plug 221. In addition, pressure delivered by valve member 207 will be effective upon the differential area of lands 208 and 209 to bias valve member 207 towards its upshift position. These two features prevent valve hunting once the valve moves to its upshift position and provide a hysteresis effect maintaining the valve in its upshift position until governor pressure drops to a value considerably lower than that required for initial valve movement from its downshift to its upshift position.

SECOND TO THIRD SHIFT VALVE

A second to third shift valve 230 (FIG. 3a) is provided to control the admission of pressure to chamber 60 of piston 54. Valve 230 includes a housing 231 enclosing a movable shift valve member 232 having spaced lands 233, 234 and 235. Land 234 is of greater diameter than land 233 and land 235 is of greater diameter than land 234. A stem 236 on valve member 232 contacts a regulator plug 237. A pair of springs 238 and 239 bias valve member 232 towards its downshift position. Ports 240, 241, 242, 243 and 244 are associated with valve member 232. Port 240 connects to drive pressure supply passage 115. Port 241 connects to passage 120. Port 242 connects to governor pressure delivery passage 119. Ports 243 and 244 connect to exhaust. Ports 245, 246, 247 and 248 are associated with regulator plug 237. Port 245 connects a chamber 249 to throttle valve delivery passage 124. Port 246 connects a passage 124B to chamber 249. Port 247 connects passage 124B to a chamber 250. Port 248 connects to a detent downshift passage 125.

Assuming the drive range selector valve 126 to be positioned in drive range position, line pressure will be delivered to port 240 through passage 115. With valve member 232 in its downshift position shown, passage 120 will be connected to exhaust through ports 241 and 243. Governor pressure from passage 119 acting on land 235 tends to move the valve to its upshift position. Springs 238, 239 and throttle valve pressure in chamber 250 tend to maintain the valve in its downshift position. At some vehicle speed depending upon pressure in chamber 250, the shift valve will upshift to connect passage 115 to passage 120. Stem 236 will move regulator plug 237 to a position wherein chamber 250 is blocked off from chamber 249 and is connected to exhaust through passage 125 and ports 171, 172 of the downshift detent valve. Throttle valve pressure tending to downshift the shift valve will be effective only upon plug 237 which is of less diameter than land 10 after the valve upshifts. This reduction of the effectiveness of throttle valve pressure upon upshift prevents valve hunting and provides a hysteresis effect. In addition, pressure delivered through valve member 232 also biases the valve member to its upshift position since land 234 is of greater diameter than land 233. Pressure in passage 120 is delivered to clutch servo chamber 60 and to brake release servo chamber to reengage clutch 50 and release brake 53.

It will be noted that pressure in passage 120 is also directed through ball shuttle valve 201 to passage 118. As heretofore stated, pressure in passage 118 positions reducer valve member 186 to deliver full line pressure to clutch chamber 58 upon an upshift from second to direct drive.

QUICK DUMP VALVE

A ball valve 251 located in passage 120 between servo chamber 60 and shift valve 230 controls the effectiveness of a restriction 252 and a restriction by-pass 253. This valve serves to cause the first to second regulator valve 185 to boost the pressure in clutch chamber 58 prior to build up of pressure in servo chamber 60. The boost in pressure in chamber 58 is effective to smooth up the reengagement of clutch 50 as pressure builds up in chamber 60.

On the other hand, when shift valve 230 moves from its upshift to its downshift position, ball 251 permits rapid exhaust of pressure from chamber 60 to provide rapid release of clutch 50.

DOWNSHIFT TIMING VALVE

A downshift timing valve 255 is positioned in passage 120 between servo chamber 60 and brake band release chamber 179 and functions to delay exhaust of pressure from brake release chamber 179 to slow up the engagement of brake band 53 upon a downshift from direct drive to second gear drive.

Valve 255 includes a valve seat 256, a valve member 257, a relatively heavy spring 258 biasing valve member 257 into engagement with valve seat 256, a ball valve 260 and a relatively light spring 259 biasing ball valve 260 into engagement with a seat 261 formed on valve member 257. Upon admission of pressure to passage 120 by shift valve 230, ball 260 will compress spring 259 to permit rapid flow of fluid to band release chamber 179 of servo 175. Upon movement of shift valve 230 to its downshift position to connect passage 120 to exhaust, spring 259 will position ball 260 on its seat. Relatively heavy spring 258 will bias valve member 257 to seat upon member 256. When the pressure is direct clutch servo 60 on the upstream side of valve 255 is reduced to a predetermined value less than that in servo chamber 179 on the downstream side of valve 255, valve member 257 will compress spring 258 to permit discharge of pressure from chamber 179. Line pressure in chamber 178 will thereupon be effective to reapply brake 53. Valve 255 delays the application of brake 53, smooths up the engagement of brake 53 and prevents clutch-brake dog fight on downshifts from direct to second gear drive.

OPERATION — NEUTRAL

With drive range selector valve 126 positioned for neutral operation, line pressure in passage 96 will be delivered to servo chamber 178 of brake servo 175 to apply brake 53. Drive range passage 115, low range passage 116 and reverse passage 117 will each be connected to exhaust by valve 126. Drum 51 will be held against rotation and clutches 50 and 52 and reverse brake 65 will be released. Since there is no reaction point in the transmission, no torque can be transmitted through the gearing.

OPERATION — DRIVE RANGE

With selector valve 126 positioned for drive range operation, pressure will be delivered through passage 96 to chamber 178 of brake servo 175 and to drive range pressure passage 115. Low range passage 116 and reverse passage 117 are connected to exhaust. As heretofore explained, vacuum controlled modulator valve 135 delivers variable pressure through passage 121 to line pressure regulator modulator plug 108 for increasing line pressure in response to increase in torque demand as expressed by carburetor throttle opening and consequent loss of manifold vacuum. Also throttle valve 152 delivers variable pressure to passage 124 which increases with movement of the vehicle accelerator pedal towards a carburetor throttle opening position. Throttle valve pressure from passage 124 biases shift valves 205 and 230 toward their downshift position and governor pressure from governor pressure delivery passage 119 biases both shift valves 205 and 230 toward their upshift position and in addition biases first to second pressure regulator valve 185 to decrease the pressure delivered to clutch apply chamber 58 through passage 122 in response to increase in vehicle speed. With brake 53 and clutch 50 engaged, the transmission is conditioned for first gear drive.

Upon increase in vehicle speed, shift valve 205 will upshift to direct pressure to chamber 62 through passage 162 to apply clutch 52. Pressure in chamber 62 is also effective to release clutch 50, since valve 185 at the speed at which a first to second upshift occurs has reduced the pressure in chamber 58 to a value less than that in chamber 62. With brake 53 and clutch 52 engaged, drive is in second gear.

While the pressure in chamber 58 is reduced when operating in drive range as described, this pressure reduction is desirable but not necessary for accomplishing a first to second shift. In low range operation the pressure in chamber 58 is not reduced. Since the areas of chambers 58 and 62 are substantially the same, a first to second shift can be had in low range, but at a higher speed than in drive range operation.

Upon further increase in vehicle speed, shift valve 230 will upshift to direct pressure to clutch chamber 60 and to brake release chamber 179 through passage 120. Also, upon upshift, valve 230 directs pressure to passage 118 through ball valve 201 to position regulator valve 185 to boost the pressure in chamber 58 irrespective of the effect of governor pressure acting on valve 185. With full line pressure in chambers 58 and 60, clutch 50 will reengage while pressure in chamber 62 maintains clutch 52 engaged.

In addition to normal upshifts and downshifts as determined by governor pressure and throttle valve pressure, a forced detent or past full throttle downshift from direct to second gear drive may be had. For a detent downshift, land 173 on plunger 159 of the throttle valve is moved to contact land 165 and to move land 165 into contact with stop member 167. Ports 170 and 171 are thereupon connected to admit pressure from passage 124 to passage 125. Pressure from passage 125, which in detent operation is full line pressure, is admitted to chamber 250 and acts on large land 235 to move shift valve 230 to its downshift or second speed position.

The timing valves 251 and 255 and their function particularly upon a downshift from direct to second gear drive have heretofore been explained.

LOW RANGE OPERATION

With drive range selector valve 126 positioned for low range operation, pressure is delivered through passage 96 to chamber 178 of brake servo 175 to apply brake 53, and pressure is delivered to drive range passage 115 and to low range passage 116. Pressure in low range passage 116 is delivered to modulator valve 135 and causes valve 135 to boost pressure in passage 121 to full line pressure. With pressure in low range passage 116, there is no available exhaust passage for modulator valve 135 and the valve ceases to regulate as it does in drive range operation. Full line pressure in passage 121 biases plug 108 of pressure regulator valve 95 to position valve 95 to boost the line pressure delivered to passage 96.

Low range passage 116 also delivers line pressure to port 163 of throttle valve 152. With pressure in passage 116, throttle valve 152 boosts the pressure delivered to throttle valve delivery passage 124 to full line pressure. This full line pressure in passage 124 is conducted through passage 124B to chamber 250 and acts on large land 235 to position shift valve 230 in its second speed or downshift position.

Line pressure in passage 124 is further directed through passage 124 to chamber 228 and acts on land 210 of shift valve 205 to position the valve in its downshift or first speed position. It will be noted that low range pressure from passage 116 is also directed through port 218 to the end of land 208, and tends to oppose the effect of line pressure in chamber 228. Low range pressure is admitted to port 218 to make possible an upshift to second gear in low range to prevent damage to the engine as might be caused by excessive engine speed in low gear. Governor pressure plus line pressure from low range passage 116 will, at some vehicle speed considerably higher than that in drive range operation, cause shift valve 205 to upshift to its second speed position.

In low range operation, line pressure from passage 116 is also directed through ball valve 201 to passage 118 to cause regulator valve 185 to cease its regulaton and to deliver full line pressure to clutch chamber 58 through passage 122.

REVERSE OPERATION

With drive range selector valve 126 positioned for reverse, pressure is maintained in brake apply chamber 178 and is directed to reverse brake servo chamber 79 to apply reverse brake 65. Reverse pressure passage 117 also delivers pressure to the space between lands 110 and 109 of regulator plug 108 to boost the line pressure in reverse. Drive passage 115 and low range passage 116 are connected to exhaust. Clutches 50 and 52 are released and brake 65 is engaged to provide reverse drive in the transmission gearing.

Figure 2A:
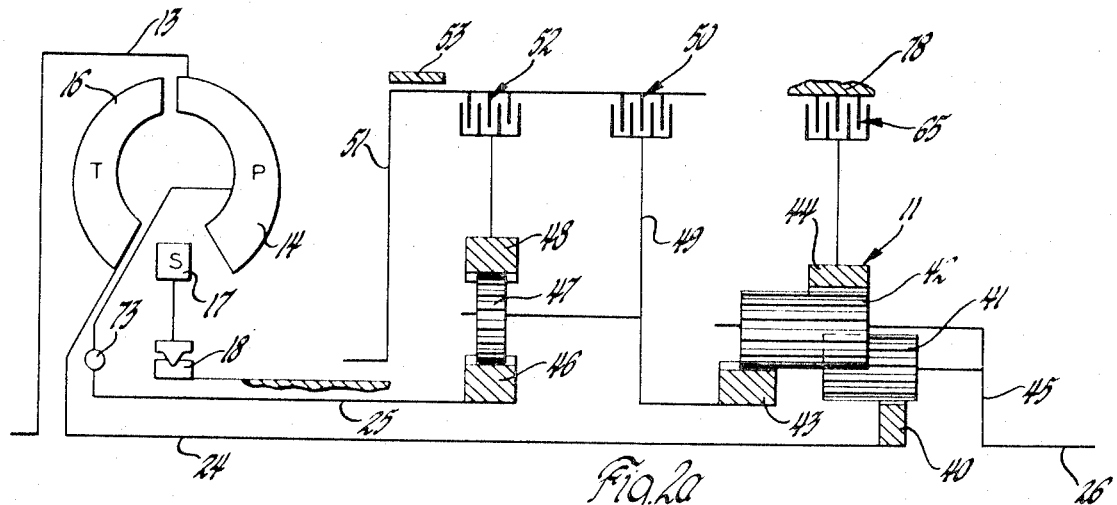
FIG. 2a is a schematic diagram of a modification of the FIG. 2 embodiment of the transmission.
Figure 3A:
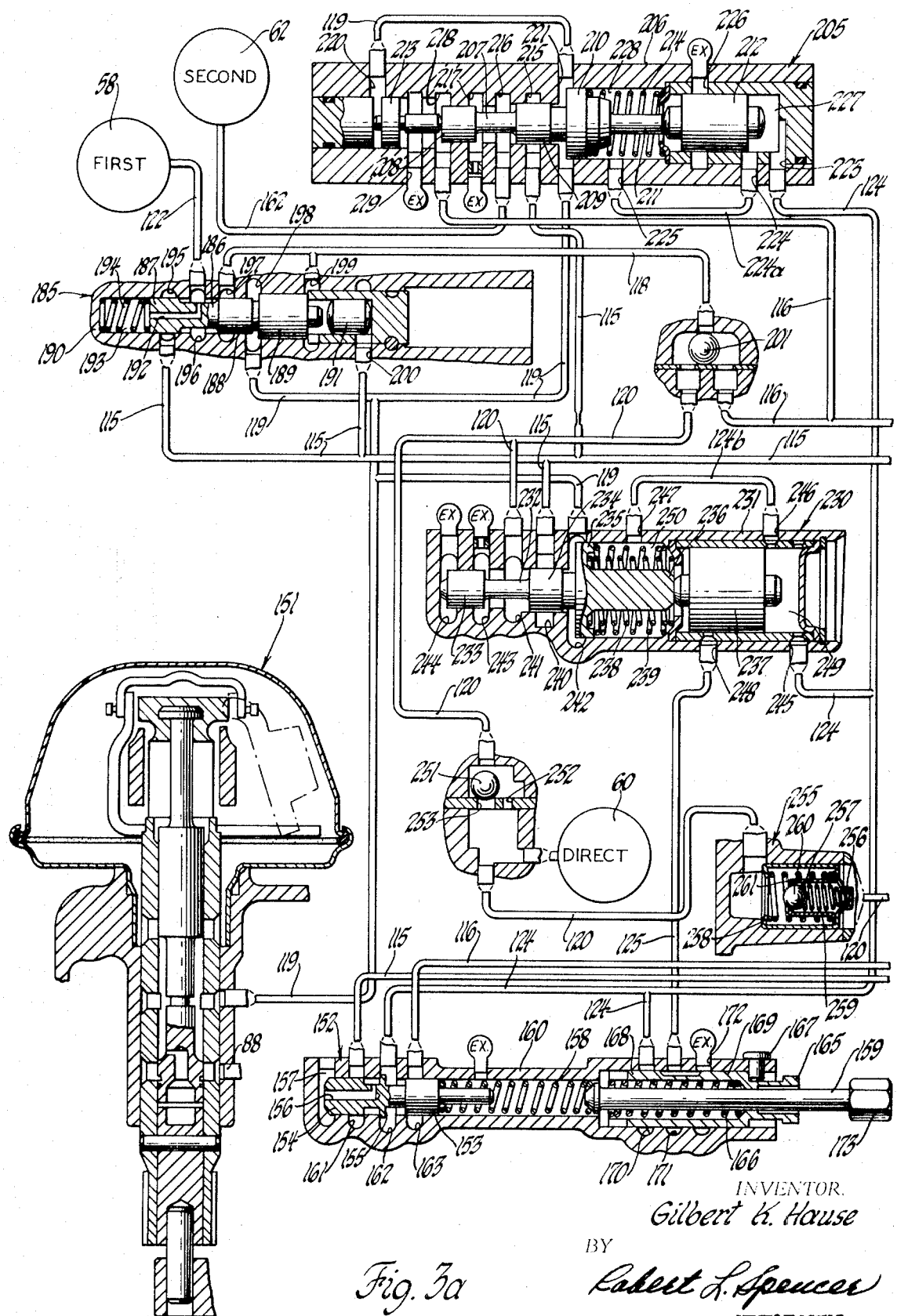
FIG. 3a is a hydraulic schematic diagram of a first portion of a control system for use with either gearing embodiment.
Figure 36:
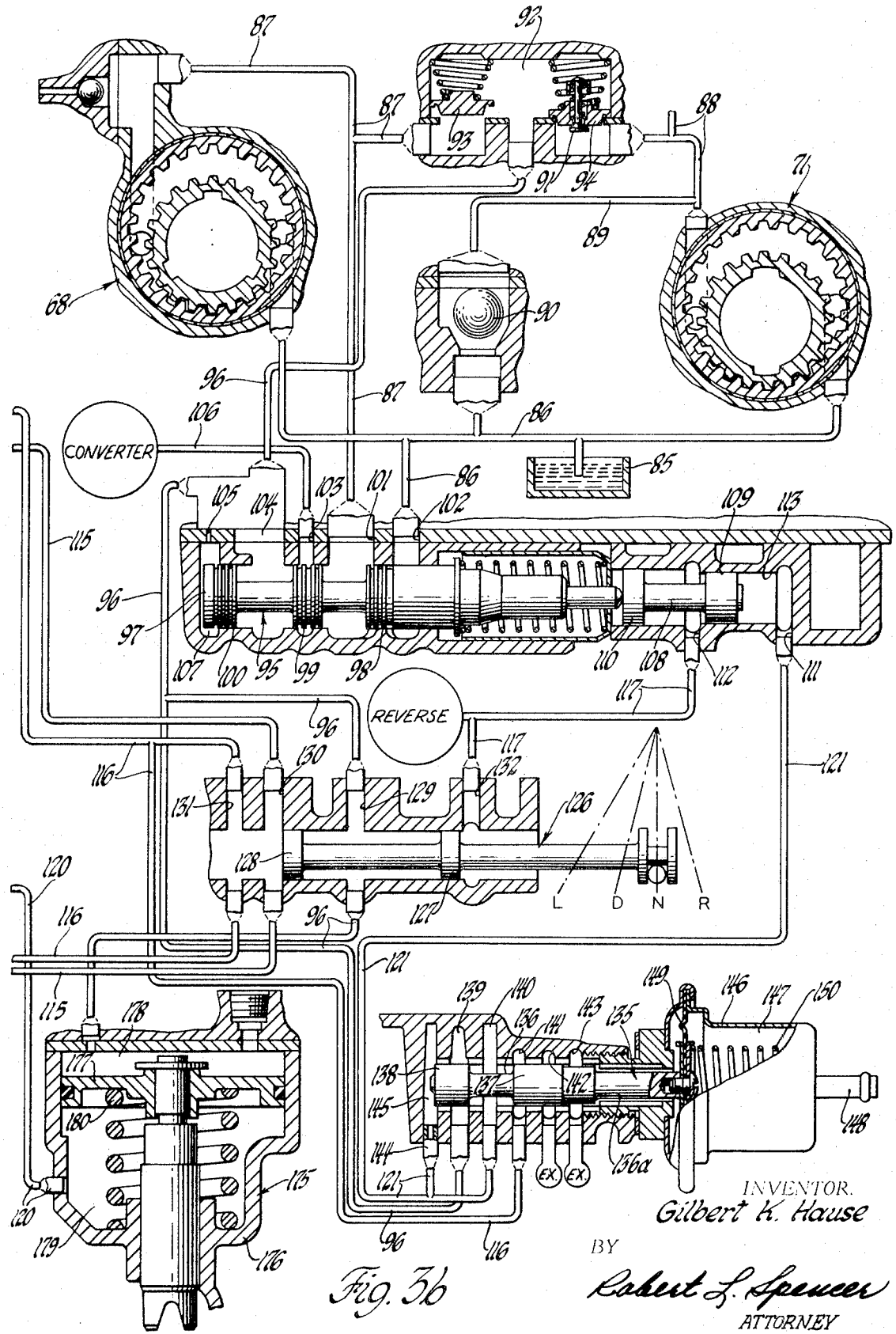

FIG. 2a is a simplified schematic diagram of a split torque drive arrangement similar to that of FIG. 2 in function but slightly modified in structure in that clutches 50 and 52 are both adapted to be alternately engaged to and released from the outer portion of drum 51. In FIG. 2, the clutch 52, when engaged, clutches ring gear 48 to the inner portion or extension 55 of drum 51. In FIG. 2a, clutch 52 is positioned to be alternately clutched to or released from the outer portion of drum 51. The structure is otherwise the same as FIG. 2 and similar numbers are used in FIG. 2a to identify parts corresponding to those of FIG. 2. The operation is similar to that of FIG. 2 and need not be reported.

Figure 4:
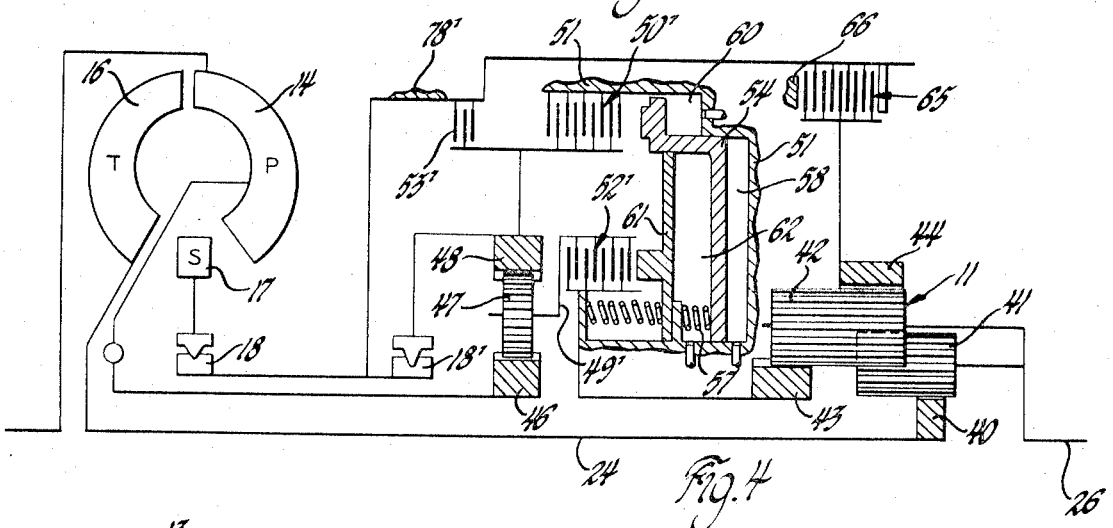
FIG. 4 is a schematic diagram of an additional modification of the transmission.

FIG. 4 shows a modification of the split torque arrangement of FIG. 2. The gear unit including gears 40, 41, 42, 43 and 44 and the reverse brake 65 is the same as FIG. 2. The gear unit including gears 46, 47, 48 and the connections between the gear units are modified over the FIG. 2 embodiment.

In FIG. 4, a one-way brake 18' functions to prevent reverse rotation of ring gear 48 and to permit forward rotation of the same. A disc brake 53' may be selectively engaged to prevent forward rotation of ring gear 48 in low and second gear drive ratios to provide engine braking, particularly for use when descending steep grades.

For low or first gear drive, brake 18' will prevent reverse rotation of ring gear 48 and clutch 50' will be engaged to clutch sun gear 43 to ring gear 48 through connector 51. Brake 53' may be engaged for overrun braking.

For second gear drive, clutch 52' will be engaged and clutch 50' released. In second gear drive, sun gear 40 is driven by turbine 16 and sun gear 43 is driven at the reduction ratio of gear units 46, 47, 48.

For direct drive, clutches 50' and 52' will be engaged and brake 53' released. The inclusion of one-way brake 18' assures smoother ratio shift than is obtainable when relying solely on disc brake 53'. It is contemplated that the pressure supply to brake 53' will include a restriction to delay application of brake 53' until after one-way brake 18' is first engaged. In this manner, brake 53' will normally be applied at a time when ring gear 48 is prevented from rotation by one-way brake 18', thus eliminating the jar which otherwise would occur when applying brake 53' at a time when ring gear 48 is in rotation.

For reverse, brake 65 is engaged to prevent rotation of ring gear 44.

The arrangement of the nested pistons and pressure chambers is the same as shown in FIG. 1b and FIG. 2 and is an important feture of this invention. For first gear drive, fluid pressure is admitted to chamber 58 to engage clutch 50. For second gear drive, fluid pressure is maintained in chamber 58 and is also admitted to chamber 62. The effective areas of chambers 58 and 62 are substantially equal. With equal pressure in chambers 58 and 62, release spring 57 will cause piston 54 to move in a direction opposite to the direction of travel of piston 61, such that piston 54 acts as an accumulator for piston 61. This accumulator action smooths up the engagement of clutch 52'. Clutch 52' will engage while piston 54 is still travelling towards its clutch release position. When piston 54 reaches the end of its stroke range, pressure in chamber 62 will rise to complete the engagement of clutch 52.

For direct drive, pressure is maintained in chambers 58 and 62 and is also admitted to chamber 60 to reengage clutch 50'. With clutches 50' and 52' engaged, direct drive is obtained.

Figure 5:
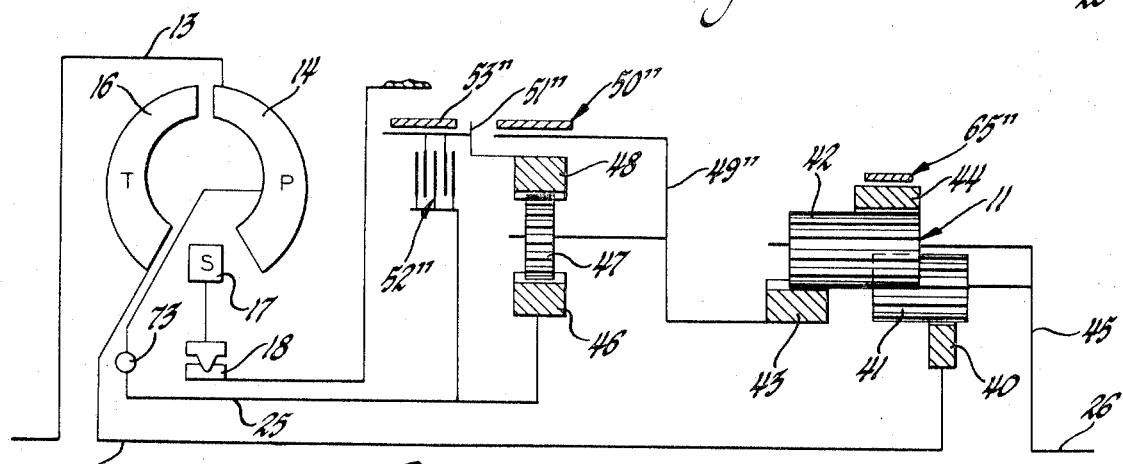
FIG. 5 is a schematic diagram of a further modification of the transmission.

In the FIG. 5 arrangement a brake band 50" may be applied to carrier 49" to hold sun gear 43 against rotation. This provides for hyraulic drive in low gear. A second brake band 53" may be applied to hold ring gear 48 against rotation for second gear drive.

For direct drive clutch 52" is engaged to clutch sun gear 46 to ring gear 48.

For reverse, brake band 65" is engaged to hold ring gear 44 against rotation.

There has thus been provided a novel gearing of simple, compact design adapted to provide three forward drive ratios, neutral, and reverse. In addition, the control system including the regulator valve 185 and the means for controlling the action of the valve 185 to decrease the pressure in clutch chamber 58 with increase of vehicle speed when operating in first or second gear drive and for delivering full line pressure to chamber 58 in direct drive or low range operation is believed novel.

The structural arrangement of clutch pistons 54 and 61 and the clutches 50, 52, operating in conjunction with drum 51 for braking sun gear 43, for providing reduction drive of sun gear 43 and for providing direct drive of sun gear 43 is also believed novel.

What is claimed is:

1. A fluid pressure operated friction gripping arrangement comprising two friction units disposed within a drum and arranged on the same side of a drum support, actuating pistons for said friction units, respectively, said pistons being disposed on the same side of said drum as said friction units and to one side of said friction units, the actuating piston for one friction unit serving simultaneously as a cylinder for the other piston which operates the second friction gripping unit and the two pistons being operative in one and the same direction for engaging their respective friction gripping units.

2. A friction gripping arrangement according to claim 1 wherein the drum support is mounted on and rotatable with a hub and is formed with a peripheral annular flange, said hub and said flange forming an annular cylinder for one piston, which piston is formed with a peripheral annular flange which, together with said hub part forms an annular cylinder for the other piston.

3. A friction gripping arrangement according to claim 2 wherein the end face of the secondly named piston for said second friction gripping unit is formed with a part which serves as a pressure plate for said second friction gripping unit.

4. A friction gripping arrangement as set forth in claim 2 wherein said piston for actuating said second friction gripping unit is operative against the resistance of a restoring spring positioned within said hub part.

5. A friction gripping arrangement according to claim 1 wherein one friction gripping unit is disposed in axial spaced relationship and radially outwardly from the other friction gripping unit.

6. A fluid pressure operated friction gripping arrangement comprising two friction gripping units positioned within a rotatable drum, said friction gripping units being positioned adjacent each other, a first piston for actuating a first of said units, said piston forming with said drum a first chamber adapted to receive fluid under pressure, a second piston for actuating said second unit and disposed within said first piston, said pistons forming therebetween a second chamber adapted to receive fluid under pressure, a third chamber adapted to receive fluid pressure, a fluid pressure source, means including valve means for directing pressure from said source to said chambers, said valve means being effective in one position to direct pressure to said first chamber to apply said first friction gripping unit, said valve means being movable to a second position to direct fluid pressure to said first and second chambers to engage said second friction gripping unit and release said first friction gripping unit, said valve means being movable to a third position to direct pressure to all three of said chambers to simultaneously engage both of said friction gripping units.

7. A fluid pressure operated friction gripping arrangement as set forth in claim 6 wherein said drum and said first piston cooperate to form said third chamber between said drum and first piston.

8. A fluid pressure operated friction gripping structure comprising a rotatable drum, first and second friction gripping discs, a first piston positioned within said drum and forming with said drum a first chamber adapted to receive fluid pressure, a second piston axially movable relative to said first piston for actuating said second discs and forming with said first piston a second chamber, a third chamber between said first piston and said drum, a fluid pressure source, and means including valve means for selectively directing pressure from said source to said chambers, said valve means being movable from a first position wherein fluid is directed to said first chamber to a position wherein fluid is directed to said first and second chambers, said valve means also being movable to a position to direct fluid from said source to all three of said chambers.

9. In a transmission, first and second friction gripping elements, a first fluid pressure responsive member for actuating said first element, a second fluid pressure responsive member for actuating said second element, means forming with said first element a first chamber adapted to receive fluid pressure, said first member being movable by pressure in said first chamber to engage said first element, a second chamber disposed between said first and second members, said second member being movable in response to fluid pressure in said second chamber to engage said second element and said first member being movable to release said first element upon admission of pressure to said second chamber and with fluid pressure maintained in said first chamber, a third chamber adapted to receive fluid pressure, said first member being movable in response to pressure in said first and third chambers to engage said first element with fluid pressure in said second chamber, a fluid pressure source, and means including valve means for directing fluid pressure from said source to said chambers.

10. A transmission as set forth in claim 9 a fluid pressure valve means is effective in a first position to direct pressure from said source to said first chamber to establish a first drive ratio, said valve means being movable to direct fluid pressure from said source to said first and second chambers to establish a second drive ratio, said valve means being movable to direct pressure from said source to said first, second and third chambers to establish a third drive ratio.

11. A transmission according to claim 9 whrein said first and second fluid pressure repsonsive members comprise pistons and wherein one of said pistons is disposed within the other piston, said first piston being movable in response to the admission of pressure to said first and second chambers to provide accumulator action to the engagement of said second friction gripping element.

12. In a transmission having planetary gearing adapted to transmit torque from a drive shaft to a driven shaft, means for controlling said transmission to establish first, second and third forward drive ratios including a rotatable clutch drum and a pair of clutches, an engageable and releasable brake for braking said drum against rotation, a brake servo having brake apply and brake release chambers adapted to receive fluid, a first clutch for clutching one element of said gearing to said drum, a first clutch servo having first and second chambers adapted to receive fluid for engaging said first clutch, a second clutch for clutching a second element of said gearing to said drum, a second clutch servo adapted to receive fluid to engage said second clutch and release said first clutch, a fluid pressure source, valve means for controlling the transmission including a pressure metering valve for controlling the pressure in said first chamber of said first clutch servo, a first shift valve for controlling the admission of pressure to said second clutch servo chamber, and a second shift valve for controlling the admission of pressure to said second chamber of said first clutch servo, a speed responsive governor driven by said driven shaft connected to said source and to said pressure metering valve and said shift valves for controlling the action of said valves, means for directing pressure from said source to said brake servo apply chamber for engaging said brake, said pressure metering valve being effective to deliver variable pressure to said first clutch servo chamber in first, second and third gear drive, said brake and said first clutch being engaged to establish first gear drive, said first shift valve being movable in response to governor pressure to direct pressure to said second clutch servo to engage said second clutch and release said first clutch to establish second gear drive, said pressure metering valve being effective in first and second gear drive to decrease the pressure delivered to said first servo chamber of said first clutch servo in response to increase in vehicle speed, said second shift valve being movable in response to governor pressure to deliver pressure to said second clutch chamber of said first clutch servo and to direct pressure to said brake release chamber of said brake servo to release said brake, said second shift valve being also effective to deliver pressure to said pressure metering valve to position said pressure metering valve to deliver full pressure from said source to said first chamber of said first clutch servo to reengage said first clutch to complete the establishment of direct drive in conjunction with the engagement of said second clutch.

13. In a fluid pressure operated torque-transmitting friction device, a first and a second torque-transmitting friction means engageable to transmit torque, cylinder means having an end wall, first piston means in said cylinder means forming a first chamber with said end wall, said first piston means being operatively connected to said first friction means and movable on the supply of fluid to said first chamber to engage said first friction means separate from said first piston means, second piston means in said cylinder means forming between said first and second piston means a second chamber, said second piston means being operatively connected to said second friction means and movable on the supply of fluid to said second chamber to engage said second friction means, said first piston means being movable on the supply of fluid to said first and second chambers to disengage said first piston means, said first piston means forming with said cylinder means a third chamber, said first piston means being movable upon the supply of fluid to all three of said chambers to engage said first friction means, a fluid pressure source, and valve means for directing pressure from said source to said chambers.

14. The invention defined in claim 13 and retraction spring means grounded with said cylinder means and acting on said first piston means to retract said first piston means upon admission of pressure simultaneously to said first and second chambers and subsequent to partial engagement of said second friction device.

15. The invention defined in claim 13 and said first piston means having an apply surface responsive to fluid pressure in said first chamber and a release surface responsive to fluid pressure in said second chamber, said second piston means having an apply surface responsive to fluid pressure in said second chamber and said surfaces being substantially equal in area, said first pistion means being movable upon admission of pressure simultaneously to both said first and second chambers to release said first friction device only after partial engagement of said second friction device.

16. The invention defined in claim 13 and retraction spring means grounded with said cylinder means and acting on said first piston means to retract said first piston means, said first piston means having an apply surface in said first chamber and a release surface in said second chamber, said second piston means having an apply surface in said second chamber, said release spring means and said surfaces on said piston means providing, when said first chamber is filled and on the supply of fluid to said second chamber, for the full disengagement to terminate torque transmittal of said first friction means during a low range of pressure increase in said second chamber and the full engagement of second friction device from substantially no torque transmittal to full torque transmittal during a higher range of pressure increase in said second chamber.

17. The invention defined in claim 16, the lower and higher range of pressure increase being continuous driving engagement of said second friction device and release of said first friction device.

18. The invention defined in claim 13 and said first piston means providing with said cylinder a third chamber and said first and second piston means being movable on the supply of fluid to said first, second and third chambers toward said first and second friction means, respectively, to engage said first and second friction means.

19. The invention defined in claim 13 and a transmission having drive means, driven means and drive means providing a first and a second ratio drive between said drive and driven means established by engagement respectively of said first and second friction means and means to control the pressure in said first chamber in accordance with driven means speed.

20. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:
 first actuating piston means for one of said clutches,
 second actuating piston means separate from said first actuating piston means for the other of said clutches, said first and second actuating piston means being disposed on the same side of said disk-like part as the respective clutches and on the same side relative to the respective clutch and being actuatable independently of one another,
 and the first actuating piston means serving simultaneously as pressure cylinder means for receiving the second actuating piston means,
 said first friction clutch comprising disk means secured to said drum-shaped structure, said second friction clutch means including disk means secured to said second actuating piston means, said first and second friction clutches as well as said first and second actuating piston means being arranged concentrically about one another.

21. An actuating mechanism for two friction clutches, especially for shifting clutches in automatically shifted motor vehicle change-speed transmissions, which clutches are arranged within a rotating drum-like structure on the same side of a disk-lke part supporting the drum-shaped structure and include friction disks and abutment means, comprising:
 first actuating piston means for one of said clutches,
 second actuating piston means for the other of said friction clutches,
 said first and second actuating piston means being disposed on the same side of said disk-like part as the respective clutches,
 the first actuating piston means serving simultaneously as pressure cylinder means for receiving the second actuating piston means,
 said disk-like part being provided inwardly thereof with a hub portion and along the outer circumference thereof with an annular portion and forming therewith a pressure cylinder for the first actuating piston means, said first and second actuating piston means being slidably supported on said hub portion, and said first actuating piston means being provided outwardly on the side thereof opposite said disk-like part with an annular extension and the second actuating piston means being inserted between said annular extension and said hub portion.

22. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:
 first actuating piston means for one of said clutches,
 second actuating piston means for the other of said friction clutches,
 said first and second actuating piston means being disposed on the same side of said disk-like part as the respective clutches,
 the first actuating piston means serving simultaneously as pressure cylinder means for receiving the second actuating piston means,
 said disk-like part being provided inwardly thereof with a hub portion and along the outer circumference thereof with an annular portion and forming therewith a pressure cylinder for the first actuating piston means and said first actuating piston means being provided outwardly on the side thereof opposite said disk-like part with an annular extension and the second actuating piston means being inserted between said annular extension and said hub portion, and said first and second actuating piston means being slidably supported on said hub portion,
 said second actuating piston means directly forming at the end face opposite said disk-like part the pressure plate means for the second clutch means.

23. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means and said first actuating piston means being provided outwardly on the side thereof opposite said disk-like part with an annular extension and the second actuating piston means being inserted between said annular extension and said hub portion and said first and second actuating piston means being slidably supported on said hub portion, said second actuating piston means directly forming at the end face opposite said disk-like part the pressure plate means for the second clutch means, return spring means for said second actuating piston means located in proximity to the inner region thereof for supporting said hub portion against stationary abutment means, and said return spring means being supported between said second actuating piston means and said hub portion.

24. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating pistion means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means, and said first actuating piston means being provided outwardly on the side thereof opposite said disk-like part with an annular extension and the second actuating piston means being inserted between said annular extension and said hub portion, and both said first and second actuating piston means being slidably supported on said hub portion, return spring means for said second actuating piston means located in proximity to the inner region thereof for supporting said hub portion against stationary abutment means, and said return spring means being supported between said second actuating piston means and said hub portion.

25. An actuating mechanism for two friction clutches, especially for shifting clutches in automatically shifted motor vehicle change-speed transmissions, which clutches are arranged within a rotating drum-like structure and the same side of a disk-like part supporting its drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, first pressure plate means in said one clutch and pressure means operatively connecting said first actuating piston means with said first pressure plate means, said pressure means being supported in an axially movable manner within said drum-shaped part and relative to the abutment means and friction disks of the second clutch, said disk-like part being provided inwardly thereof with a hub portion and along the outer circumference thereof with an annular portion and forming therewith a pressure cylinder for the first actuating piston means, and said first actuating piston means being provided outwardly on the side thereof opposite said disk-like part with an annular extension and the second actuating piston means being inserted between said annular extension and said hub portion.

26. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising: first actuating piston means for one of said clutches, second actuating piston means separate from said first actuating piston means for the other of said clutches, said first and second actuating piston means being disposed on the same side of said disk-like part as the respective clutches and on the same side relative to the respective clutch and being actuatable independently of one another, and the first actuating piston means serving simultaneously as pressure cylinder means for receiving the second actuating piston means, said first friction clutch comprising disk means secured to said drum-shaped structure, said second friction clutch means including disk means supported on parts of the second friction clutch to be rotatively connected with each other, said first and second friction clutches as well as said first and second actuating piston means being arranged concentrically about one another.

27. In a fluid pressure operated torque-transmitting friction device, a first and a second torque-transmitting friction means engageable to transmit torque, cylinder means having an end wall, first piston means in said cylinder means forming a first chamber with said end wall, said first piston means being operatively connected to said first friction means and movable on the supply of fluid to said first chamber to engage said first friction means, second piston means separate from said first piston means in said cylinder means forming between said first and second piston means a second chamber, said second piston means being operatively connected to said second friction means and movable on the supply of fluid to said second chamber to engage said second friction means, said first piston means being movable on the supply of fluid to said first and second chambers to disengage said first piston means, a fluid pressure source, and means for directing fluid pressure from said source to said chambers.

* * * * *

UNITED STATES PATENT OFFICE
CERTIFICATE OF CORRECTION

Patent No. 3,747,730                Dated    July 24, 1973

Inventor(s)    Gilbert K. Hause

It is certified that error appears in the above-identified patent and that said Letters Patent are hereby corrected as shown below:

Column 2, line 42, "drive" should read -- driven --.

Column 4, line 47, "pistion" should read -- piston --.

Column 12, line 37, "is" should read -- in --.

Column 15, line 33, "feture" should read -- feature --.

Column 17 (Claim 8), line 2, after "second" insert --　sets of --

"      " (Claim 10), lines 38, 39, after "claim 9" delete "a fluid pressure" and substitute therefor -- wherein said --;

"      " (Claim 11), line 48, "repsonsive" should read -- responsive --.

Column 18, (claim 13), line 47, delete "separate from said first piston means";
line 48, after "means" insert -- separate from said first piston means --.

Column 19, (Claim 15), line 4, delete "fluid";
line 6, delete "fluid";
(Claim 16), line 24, after "of" insert -- said --;
(Claim 17), line 30, delete "driving" and substitute therefor -- during --.

Column 20 (claim 21), line 8, "disk-lke" should read

-- disk-like -- .

UNITED STATES PATENT OFFICE
CERTIFICATE OF CORRECTION

Patent No. 3,747,730                     Dated  July 24, 1973

Inventor(s)  GILBERT K. HAUSE                       PAGE 2

It is certified that error appears in the above-identified patent and that said Letters Patent are hereby corrected as shown below:

Column 21, (claim 24), line 41, "pistion" should read -- piston -- .

Column 22, (claim 25), line 5, "and" should read -- on -- ; line 6, "its" should read -- the -- .

Signed and sealed this 6th day of August 1974.

(SEAL)
Attest:

McCOY M. GIBSON, JR.                C. MARSHALL DANN
Attesting Officer                   Commissioner of Patents